United States Patent

Suzuki et al.

Patent Number: 5,398,119
Date of Patent: Mar. 14, 1995

[54] PHOTOELECTRIC CONVERSION DEVICE'S SHADING CORRECTION CIRCUIT

[75] Inventors: Kiyosuke Suzuki, Saitama; Hideki Wanami, Kanagawa, both of Japan

[73] Assignee: Sony Corporation, Japan

[21] Appl. No.: 691,870

[22] Filed: Apr. 26, 1991

[30] Foreign Application Priority Data

May 19, 1990 [JP] Japan .................. 2-129677

[51] Int. Cl.$^6$ .............................................. H04N 1/40
[52] U.S. Cl. ...................................... 358/461; 358/463
[58] Field of Search ................... 358/461, 464, 483

[56] References Cited

U.S. PATENT DOCUMENTS

| | | | |
|---|---|---|---|
| 4,051,458 | 9/1977 | Morton | 358/161 |
| 4,236,174 | 11/1980 | Gall | 358/80 |
| 5,001,768 | 3/1991 | Mita et al. | 358/461 |

Primary Examiner—Curtis Kuntz
Assistant Examiner—Ping W. Lee
Attorney, Agent, or Firm—Ronald P. Kananen

[57] ABSTRACT

A shading correction circuit for correcting the shading distortion of a photoelectric conversion device including a plurality of arrayed photocells, has a memory for storing data on the output characteristics of each pixel, represented by image signals having a given level outputted by the photoelectric conversion device a plurality of image pickup times. Thereby, the data on the output characteristics of each pixel stored in the storing means is read by desirably switching the order of the image pickup for each pixel to provide shading correction data. Noise or irregularities which readily appear on the output picture after shading correction are reduced.

11 Claims, 3 Drawing Sheets

PHOTOELECTRIC CONVERSION DEVICE'S SHADING CORRECTION CIRCUIT

BACKGROUND OF THE INVENTION

The present invention relates to a correction circuit, and in particular to a circuit for correcting the shading distortion of a photoelectric conversion device.

RELATED ART

Two dimensional image reading is performed by moving or scanning a photoelectric conversion device. A so-called line sensor comprises a CCD image pickup device having one dimensionally arrayed photocells for movement in a subscanning direction normal to a main scanning array direction of the photocells, for example, in an image reading function unit of a facsimile or scanner.

Many of such image reading function units perform shading correction for eliminating the irregularities in tone reproduction characteristics. So-called shading distortion is due to irregularities in the quantity of light of a light source for illustrating an original image document and irregularities in the sensitivity of photocells.

The shading correction generally includes a black level correction and a white level correction. Shading correction is performed by correcting the outputs from a sensor based upon black and white reference levels. Black and white levels which are outputted from a photoelectric conversion device, such as a CCD line sensor when the light source is turned off and when an illuminated white standard board provided on an original image document position is image-picked up, respectively. The black and white levels are determined for each pixel and stored in a memory as the black and white reference levels.

If quantization irregularities or external noise occurs when the black and white reference levels are determined for such a shading correction, black and white levels containing these adverse components would be stored in the memory. If shading correction is performed by using these black and white levels as reference levels, the quantization irregularities due to correction would appear as a linear noise, i.e. a horizontal stripe, extending in the subscanning direction on an output picture.

This appears particularly for black level correction. In other words, although the black level correction corrects the irregularities of an output from a sensor at darkness, it has a disadvantage that a quantization irregularity due to correction becomes an horizontal stripe. This stripe is prominent particularly when shading correction is performed for a solid black original image document.

The present invention was made for overcoming the above mentioned problems.

It is an object of the present invention to provide a shading correction circuit for a photoelectric conversion device which is capable of reducing an adverse influence such as a horizontal stripe appearing in an output picture upon shading correction.

In order to accomplish the object, the present invention provides shading correction circuit for correcting the shading distortion of the photoelectric conversion device including a plurality of arranged photocells, comprising storing means for storing data indicative of output characteristics of each pixel, represented by image signals having a given level respectively outputted by said photoelectric conversion device a plurality of image pickup time, and means for reading the data on the output characteristics of each pixel stored in said storing means by desirably changing the order of the image pickup for each pixel to provide shading correction data.

Since the data on the output characteristics obtained by image pickup a plurality of times are used for shading correction by desirably switching the order of the image pickup for each pixel, correction irregularities on shading correction can be made random so that a horizontal stripe due to a fixed pattern can be prevented from occurring.

DESCRIPTION OF THE PREFERRED EMBODIMENTS

Figure 1:
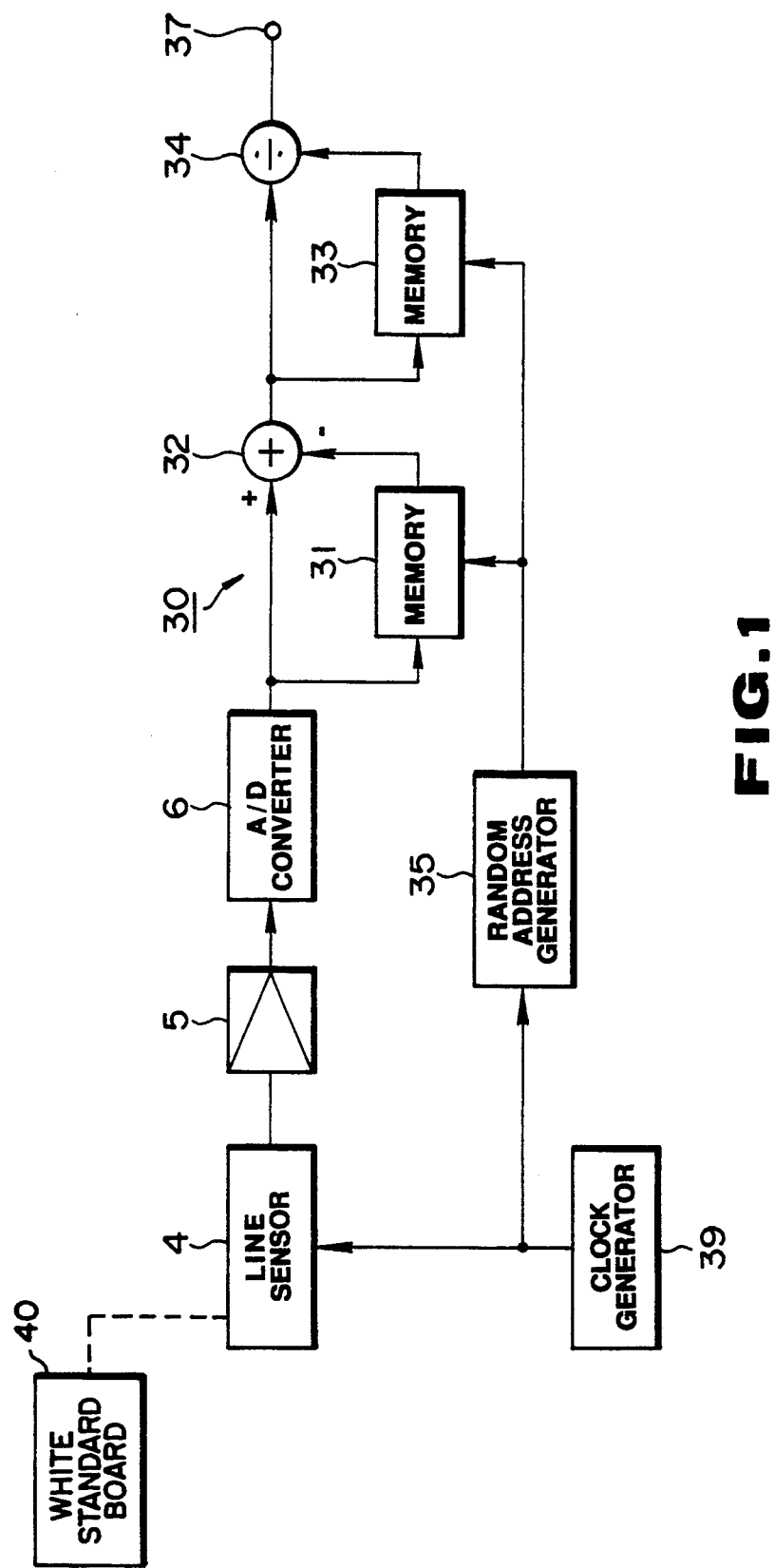
FIG. 1 is a block diagram showing an embodiment of a circuit for correcting the shading of a photoelectric conversion device of the present invention and its peripherals.

FIG. 1 is a block diagram showing one embodiment of a circuit for correcting the shading of a photoelectric conversion device of the present invention. A so-called CCD line sensor is used as the photoelectric conversion device. FIG. 2 is an output characteristic chart explaining the operation of the embodiment.

Referring now to FIG. 1, a CCD line sensor 4 comprises a plurality of photocells, for example, 1728, which are arrayed in a main scanning direction, i.e. in a line direction. An image output signal from the line sensor 4 is amplified by an amplifier 5 and fed to an A/D converter 6 in which the input signal is converted into a digital signal. The converted digital signal is fed to a shading correction circuit 30. The shading correction circuit 30 is formed in such a manner that black correction is performed by a memory 31 for storing black reference levels and an adder (subtracter) 32 and white correction is performed by a memory 33 for storing white reference levels and a divider 34 and a shading corrected data is outputted from an output terminal 37. The memories 31 and 33 have read/write addresses controlled by a random address generating circuit 35 which is operated in response to clock signals from a clock generator 39. The clock signals from the clock generator 39 are also supplied to the line sensor 4.

In such a structure, dark current outputs which are obtained from a line sensor 4 when a light source for illuminating a original picture document is turned off are converted into digital data by the A/D converter 6 and are fed as image data representative of black and white reference levels to the memory 31 in which they are stored. In this case, the image pickup is performed a plurality of times (for example, four times) by the line sensor 4. The black level data of each time is stored in the memory 31. Specifically, the number of the photocells the, i.e. number of pixels, arrayed in a main scanning direction of the CCD line sensor 4 is 1728. When black level image data of four lines are read while the CCD line sensor 4 is moved in a subscanning direction normal to the main scanning direction, the data stored in the memory 31 are shown in the following Table 1.

TABLE 1

| FIRST LINE | $D_{1,1}$ | $D_{1,2}$ | $D_{1,3}$ | ... | $D_{1,1728}$ |
| --- | --- | --- | --- | --- | --- |
| SECOND LINE | $D_{2,1}$ | $D_{2,2}$ | $D_{2,3}$ | ... | $D_{2,1728}$ |
| THIRD LINE | $D_{3,1}$ | $D_{3,2}$ | $D_{3,3}$ | ... | $D_{3,1728}$ |
| FOURTH LINE | $D_{4,1}$ | $D_{4,2}$ | $D_{4,3}$ | ... | $D_{4,1728}$ |

In Table 1, $D_{n,m}$ denotes a black reference level image data of the m-th pixel (m=1 to 1728) on the n-th line. The movement of the line sensor 4 in the subscanning direction may not be performed. Image pickup may be repeated four times on the same position.

Next, outputs from the line sensor 4 when a white standard board 40 is to be illuminated with light from a light source, that is, white reference level image data are stored in the memory. Also in this case, white level data of a plurality of times (a plurality of lines) may be determined according to needs and stored in the memory 33.

The storing operation of the black and white level data is performed prior to the reading of an actual original image document. For example, a white standard board 40 and the like are provided in front of an original image document reading start position. Reading and storing of the black and white level data may be performed while the line sensor 4 is moved from the position of the white standard board 40 to the image document reading start position.

Next, on reading of the actual original image document, shading correction processing is performed based upon the black and white level data stored in memories 31 and 33. At least the black level data of a plurality of lines (four lines) are stored in the memory 31 as mentioned above and the black reference level data for shading correction are obtained by reading the memory 31 by desirably changing the lines for each pixel. In other words, the random address generating circuit 35 generates random read addresses in response to clock signals from the clock generator 39 so that the lines are randomly selected for each pixel. It will suffice to cause the random number generator to generate random numbers 1 to 4 and the randomly generated random number of 1 to 4 is inputted as an address each time the pixel address is incremented. Alternatively, the line address is made random based upon a pseudo random number table and the like. In this case, when the image reading is performed while the line sensor 4 is moved in the subscanning line, an example of the output black level data which are read in the cycle of 4 times are shown in Table 2 as follows:

TABLE 2

| FIRST LINE | $D_{1,1}$ | $D_{3,2}$ | $D_{2,3}$ | ... | $D_{4,1728}$ |
| --- | --- | --- | --- | --- | --- |
| SECOND LINE | $D_{2,1}$ | $D_{1,2}$ | $D_{4,3}$ | ... | $D_{3,1728}$ |
| THIRD LINE | $D_{3,1}$ | $D_{4,2}$ | $D_{1,3}$ | ... | $D_{2,1728}$ |
| FOURTH LINE | $D_{4,1}$ | $D_{2,2}$ | $D_{3,3}$ | ... | $D_{1,1728}$ |

A correction operation is performed for the image data read from the first to fourth lines on the original document reading start position based on the black reference level image data of each of the first to fourth lines shown in Table 2. Different black level data are recursively used in the cycle of four lines so that black correction is performed for the image data on the fifth line based on the data of the first line in Table 2. This operation corresponds to shuffling among lines of the black level data of each pixel which is performed within four lines. A fixed pattern on the line is eliminated by such a shuffling so that generation of a horizontal stripe is reduced. An adverse influence to the output image after correction can be further reduced by storing white level data of a plurality of lines in the memory 33 and by performing shuffling among lines for each pixel to read the data so that the read data are used as white reference level image data for white correction. Although memory access is performed by a normal line address on writing correction reference data in the example of Tables 1 and 2 and shuffling among lines is performed by a random line address on reading of memory, shuffling among lines may be performed when writing data and the line address on reading may be incremented in normal order.

The principle of the shading correction will now be briefly described with reference to FIGS. 2A to 2 D.

Figure 2A:
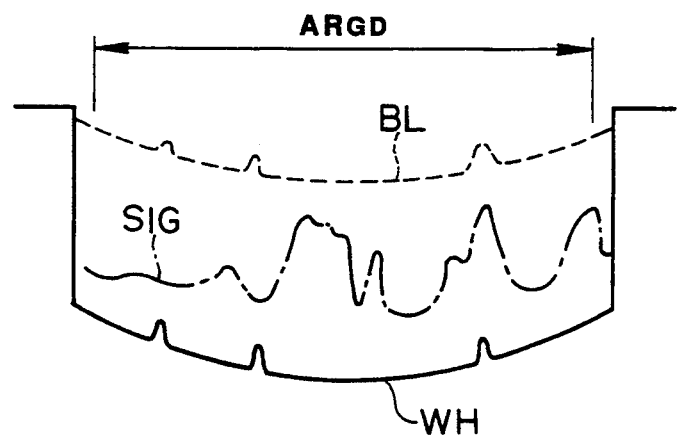
FIGS. 2A through 2D are waveform views explaining operation of the embodiment.
Figure 2B:
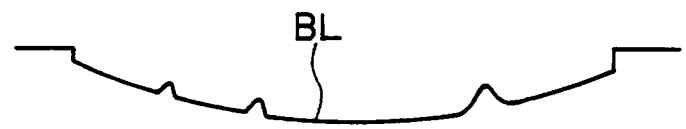
Figure 2C:
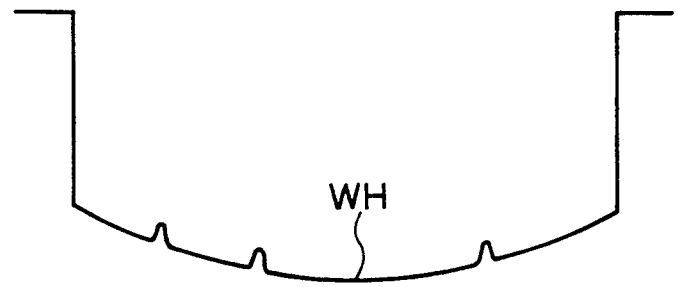

FIG. 2A shows an output image signal from the line sensor 4 prior to shading correction. There are shown a black level signal BL outputted from the sensor when the light source is turned off, a white level signal WH outputted from the sensor when the white standard board 40 is read, and an example of an image signal SIG outputted from the sensor when an usual original image document is read. In the black and white level signals BL and WH, a low frequency distortion component changing over the entire image reading area $AR_{GD}$ and a high frequency distortion component changing in a short area of several pixels appear which are superposed with each other. The black and white signals BL and WH are stored in the memories 31 and 33, respectively. The black and white level data BL and WH which are stored in the memories 31 and 33, respectively, are shown in FIG. 2B and FIG. 2C, respectively. Shading correction is performed by subtracting the black level data from each corresponding pixel data represented by the image signal obtained by image pickup and dividing the subtraction result with the corresponding white level data. If the image data of the kth pixel, where k=1 to 1728, is represented as $S_k$, the black and white level data are represented as $B_k$ and $W_k$, respectively, and the corrected kth image data $V_k$ (8 bits) is determined as follows:

$$V_k = \frac{S_k - B_k}{W_k} \times 256$$

The data which is shuffled among plural lines for each pixel at least is used as the black level data $B_k$.

Figure 2D:
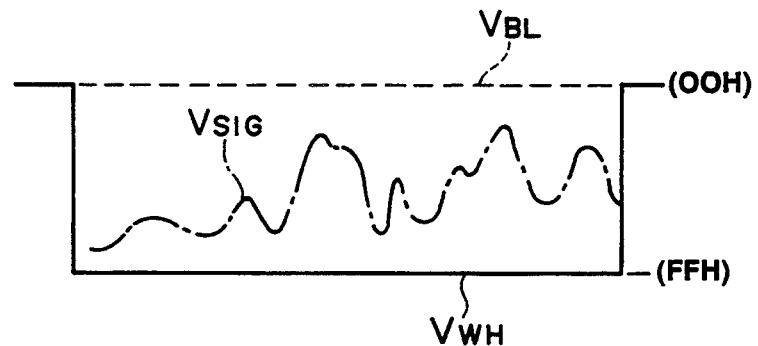

An output as shown in FIG. 2D is obtained by such a shading correction operation. A signal $V_{SIG}$ in FIG. 2D is a shading corrected signal. The corrected black level $V_{BL}$ is represented as 00H (H shows a hexadecimal number). The white level $V_{WH}$ is represented as FFH.

Although the shading corrected output pixel data is 8 bits long in the embodiment, it is of course possible that it may be any desired number of bits.

Figure 3:
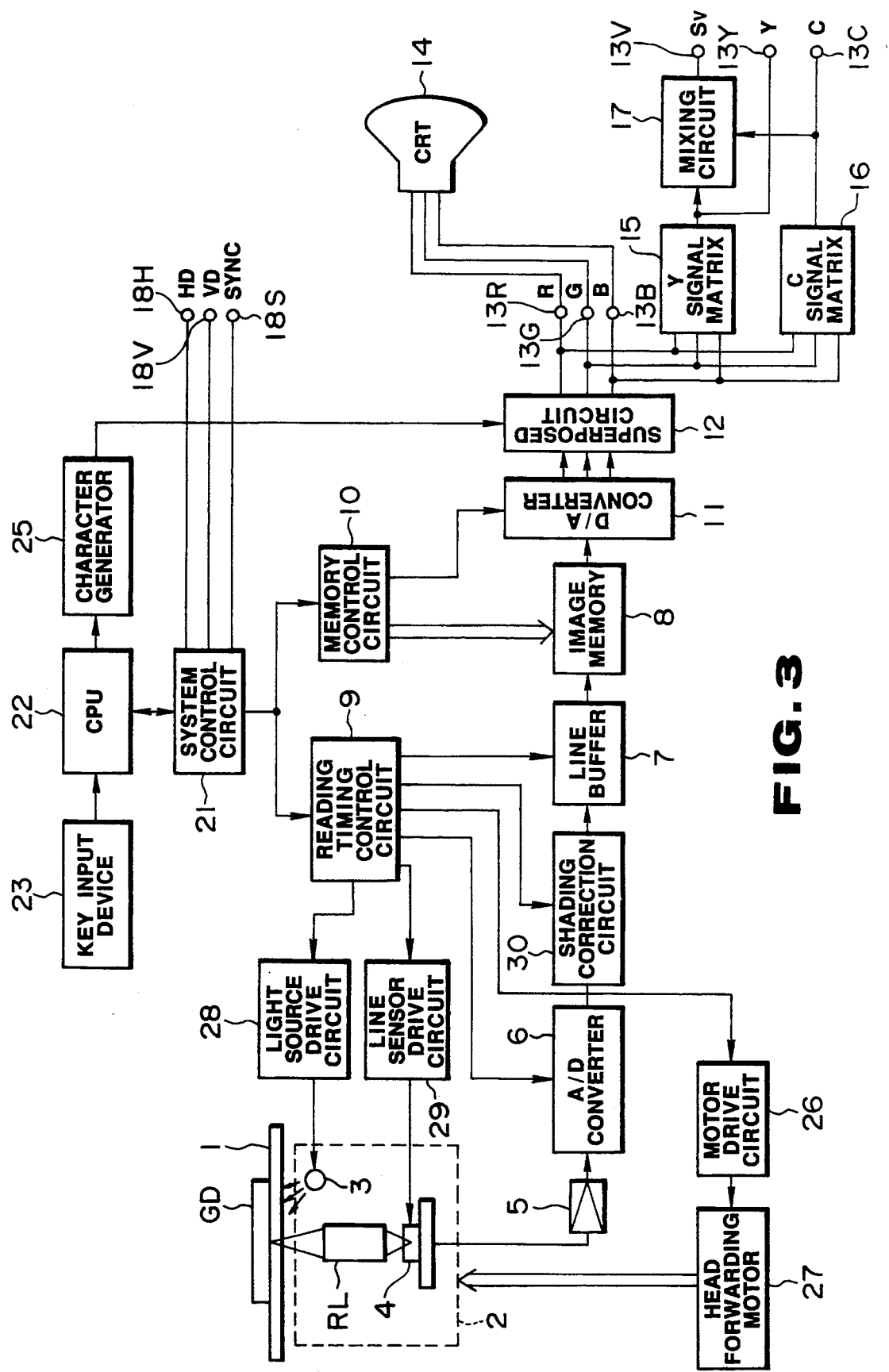
FIG. 3 is a schematic block diagram showing the whole of an image reading apparatus in which the present embodiment is used.

An example of an image reading apparatus to which the embodiment of the circuit for correcting the shading of a photoelectric device of the present invention will now be described with reference to FIG. 3. FIG. 3 shows a basic structure of an image reading apparatus in which an original image document is read and the image data are stored in an image memory and image signals for still video display are outputted from the image memory by repetitively reading the image memory in synchronization with television signals having a given format, such as horizontal and vertical scanning signals of a so-called NTSC format television signals. The image reading apparatus is proposed in each specification and drawings of Japanese Patent Applications Hei 1-83330, Hei 1-83696 and Hei 1-83697 filed by the present assignee. Such an image reading apparatus is capable of reading an image original document and displaying the same in a fast response time.

In the image reading apparatus shown in FIG. 3, an image reading head 2 for reading an original image document GD placed on an original document platen 1 is provided with a light source 3, a multi-lens array RL and a CCD line sensor 4. The light source 3 illuminates the original image document GD and the light reflected on the original image document GD is incident upon the line sensor 4 via the multi-lens array RL. The line sensor 4 comprises, for example, 1728 CCD photocells which are linearly arrayed in a main scanning direction. When one line of the image original document GD is in the main scanning direction vertical direction in a display screen, the light source 2 sequentially emits lights corresponding to three primary colors, R, G and B so that three primary color image signals are sequentially obtained in a line, i.e., in a vertical direction in the display screen. Outputs from the line sensor 4 of the image reading head 2 are amplified by an amplifier 5 and fed to an A/D converter 6 in which they are converted into digital image data. The digital image data are fed to the shading correction circuit 30 which has been described with reference to FIG. 1 in which such data are corrected for shading. At this time, at least the black level data is corrected for shading by using data shuffled among plural lines for each element as mentioned above.

The shading corrected digital image data are synchronized by a so-called FIFO line buffer 7 and are outputted and stored in the image memory 8. A reading timing control circuit 9 is adapted to control a motor drive circuit 26, a light source drive circuit 28, and a line sensor drive circuit 29. The motor drive circuit 26 drives to rotate a head forwarding motor 27 for moving an image reading head 2 in the subscanning direction. The light source drive circuit 28 drives and controls the light source 3 to emit lights R, G and B. The line sensor drive circuit 29 drives and controls the line sensor 4 in the image reading head 2. The clock generator 39 in FIG. 1 substantially corresponds to a reading timing control circuit 9 and a line sensor drive circuit 29.

The image memory 8 in which digital image data for each of the colors R, G and B is controlled in response to control signals from a memory control circuit 10 so that data are read from and written into the memory 8. In other words, in a writing mode, data of R, G and B are sequentially written into the memory for each line in a vertical direction according to the movement of the line sensor LS in a horizontal direction, i.e. a subscanning direction, since the direction, i.e., a main scanning direction, in which the photocells of the line sensor 4 are arrayed is the vertical direction of the screen. In a mode of reading from the image memory 8, the memory control circuit 10 performs an address access for vertical movement while repeating the horizontal line scanning in a timing relationship with the horizontal (H) synchronization signal and the vertical (V) synchronization signal format (for example, NTSC format) so that the digital image data of R, G and B are in parallel read and outputted from the memory.

Each digital image data of R, G and B read from the image memory 8 is converted into an analog signal by a D/A converter 11 and fed to a superposed circuit 12. The superposed circuit 12 is supplied with character display signals for displaying functions related with various operations of the image reading apparatus with alphanumerical characters from a character generating circuit 25. The character generating circuit 25 is also capable of generating characters for display, for example, a pointer mark or a trimming frame. In the superposed circuit 12, the character display signal from the character generating circuit 25 is superposed on the analog image signal and outputted. The R, G and B picture signals from the superposed circuit 12, i.e., so-called color component signals, are fed to a display such as a color CRT (cathode ray tube) 14 via output terminals 13R, 13G and 13B, respectively. The R, G and B picture signals from the superposed circuit 12 are also fed to a Y (luminance) signal matrix circuit 15 and a C (chrominance) signal matrix circuit 16 to provide Y and C signals. The Y and C signals are outputted from output terminals 13Y and 13C, respectively, and then mixed with each other in a mixing circuit 17 to provide a so-called composite color picture signals $S_v$, which is then outputted from an output terminal 13 V.

The reading timing control circuit 9 and the memory control circuit 10 and the memory control circuit 10 are controlled by a system control system which is also called a system controller 21. The system control circuit 21 transmits and receives data and control signals to and from a CPU 22. The system control circuit 21 may be integrally formed with the CPU 22. A key input device 23 is adapted to provide the CPU 22 with key input signals for initiating image reading, for scrolling the displayed image on the screen, for displaying pointer marks to indicate desired positions in the displayed image and for displaying a trimming frame for reading the designated desired area on the displayed image again. The CPU 22 controls the character generating circuit 25 for generating desired characters such as pointer marks or trimming frames and applies the character display signals based upon these characters to the superposed circuit 12.

A horizontal synchronization signal HD, a vertical synchronization signal VD and a composite synchronization signal SYNC in which the signals HD and VD are mixed with each other are fed from the system control circuit 21 to output terminals 18H, 18V and 18S, respectively.

In accordance with the thus-formed image reading apparatus, an original image document can be converted into image data in a fast response time and then be displayed on a CRT monitor display. This image reading apparatus is preferably used for demonstration and presentation in, for example, exhibition and lecture.

If the circuit for correcting the shading of a photoelectric conversion device of the present invention is used for such an image reading apparatus, fixed patterns on a line of at least black level data are eliminated so that an adverse influence such as a horizontal strip on the outputted image can be reduced. An adverse influence of white level data upon the output image can be reduced. An adverse influence of white level data upon the output image can be further reduced by shuffling the white level data among a plurality of lines.

As is apparent from the foregoing, in accordance with a circuit for correcting the shading of photoelectric conversion device of the present invention, data on the output characteristics of each pixel of image signals having a given level which are pickup plural times by a photoelectric conversion device are stored each time an image pickup is performed. The data on the output characteristics of each pixel are read to provide shading correction data by switching the order of the image pickup for each pixel. A fixed pattern generated by one image pickup is dispersed over image pickup data of a plurality of times so that an adverse influence such as a horizontal stripe appearing on an output picture can be reduced.

In accordance with the present invention, the circuit is simpler than that of a case in which obtained output characteristic data are averaged by a plurality of image pickups and averaging processing time is not necessary so that the circuit of the present invention is suitable for fast image processing.

What is claimed is:

1. A shading correction circuit for correcting shading distortion of a photoelectric conversion device having a plurality of arrayed photocells, comprising:

storing means for storing data indicative of image output characteristics for each pixel, with each pixel respectively corresponding to one of said plurality of arrayed photocells, said data being represented by image signals having a given level respectively outputted by said photoelectric conversion device when said image output characteristics data of said photocells are read a plurality of image pickup times; and reading means associated with said storing means for reading from said storing means the image output characteristics data for each pixel at one of said image pickup times and for selectively varying the image pickup time read as the image output characteristics data for each of the plurality of photocells so as to provide shading correction data.

2. A shading correction circuit as defined in claim 1, wherein said photoelectric conversion device is a line sensor comprising said plurality of photocells, which are arrayed in a line direction, the image output characteristics data for each pixel of a plurality of lines being stored in said storing means, with each of said plurality of lines respectively corresponding to one of said plurality of image pickup times.

3. A shading correction circuit as defined in claim 2, wherein image data of a black reference level, which is obtained by analog-to-digital converting a dark current output of said line sensor obtained at darkness, is used as the image output characteristics data.

4. A shading correction circuit as defined in claim 2, wherein image data of a white reference level, which is obtained by analog-to-digital converting a dark current output of said line sensor obtained when a white standard board is illuminated with light, is used as the image output characteristics data.

5. A shading correction circuit as defined in claim 2, further comprising a random address generating circuit for randomly selecting one line of the image output characteristics data from said plurality of lines stored in said storing means for each pixel.

6. A shading correction circuit as defined in claim 2, wherein said data storing means comprises means for randomly selecting a line of the image output characteristics data for each pixel.

7. A shading correction circuit, comprising:

a line sensor having a plurality of photocells arrayed in a main scanning direction, said photocells providing an image data output;

means for converting said image data output from said photocells into a digital signal;

a first memory for storing black reference levels for said photocells for correcting said digital signal;

random address generating means connected to said first memory for randomly selecting a line of said black reference levels indicative of the output characteristics for each pixel from a plurality of lines of black reference levels stored in said first memory means;

a clock for providing a clock signal to said random address generating means for controlling the selection of said line from said first memory, said clock also providing said clock signal to said line sensor; said black reference levels being obtained from said line sensor in the absence of a light source for said line sensor for a plurality of image pickup times, with said plurality of image pickup times respectively corresponding to said plurality of lines; and means for reading said lines of black reference levels stored in said storing means and for selectively varying the image pickup time read as the black reference level for the plurality of photocells so as to provide shading correction data.

8. The shading correction circuit as set forth in claim 7, further comprising means for correcting image data read from a plurality of lines of an original document based on said black reference levels by first reading said black reference levels for each of said plurality of lines.

9. The shading correction circuit as set forth in claim 8, further comprising a second memory for storing white reference levels for correcting said digital signal, said white reference levels being obtained from said line sensor viewing a white board;

wherein said means for correcting image data subtracts said black reference levels from said digital signal to produce a first corrected output signal and then divides said first corrected output signal by said white reference levels to produce a second corrected output signal.

10. The shading correction circuit as set forth in claim 7, wherein said shading correction circuit further comprises a second memory for storing white reference levels for correcting said digital signal, said white reference levels being obtained from said line sensor viewing a white board.

11. The shading correction circuit as set forth in claim 7, wherein said means for correcting image data subtracts said black reference levels from said digital signal.

* * * * *